US012726247B2

(12) United States Patent
Panchal

(10) Patent No.: US 12,726,247 B2
(45) Date of Patent: Sep. 1, 2026

(54) IDENTIFICATION OF EXTERNAL INTERFERENCE IN DOWNLINK DIRECTION IN THE WIRELESS COMMUNICATION NETWORK USING CHANNEL STATE INFORMATION

(71) Applicant: Charter Communications Operating, LLC, St. Louis, MO (US)

(72) Inventor: Pareshkumar Panchal, Highlands Ranch, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 265 days.

(21) Appl. No.: 18/775,264

(22) Filed: Jul. 17, 2024

(65) Prior Publication Data

US 2026/0025176 A1 Jan. 22, 2026

(51) Int. Cl.
*H04B 7/06* (2006.01)
*H04B 17/345* (2015.01)
*H04W 64/00* (2009.01)

(52) U.S. Cl.
CPC ......... *H04B 7/0626* (2013.01); *H04B 17/345* (2015.01); *H04W 64/003* (2013.01)

(58) Field of Classification Search
CPC .. H04B 7/0626; H04B 17/345; H04W 64/003
(Continued)

(56) References Cited

U.S. PATENT DOCUMENTS 9,496,940 B2 11/2016 Einhaus et al.
12,184,367 B1 * 12/2024 Sung ..................... H04W 24/10
(Continued)

FOREIGN PATENT DOCUMENTS

CA 2831028 C * 8/2023 ........... H04B 17/318
EP 2227869 B1 * 10/2018 ............. H04B 7/026
(Continued)

OTHER PUBLICATIONS

3GPP, "Physical layer procedures for data", ETSI, TS 38.214, Version 16.2.0, 167 pages, Jul. 2020, URL: https://www.etsi.org/deliver/etsi_ts/138200_138299/138214/16.02.00_60/ts_138214v160200p.pdf.

*Primary Examiner* — Anthony Mejia
(74) *Attorney, Agent, or Firm* — Young Basile Hanlon & MacFarlane. P.C.

(57) ABSTRACT

Methods and systems for identifying external interference in a wireless communications network from channel state information. A method can include receiving, by a channel state engine, network issue data indicating external interference on one or more wireless communications transmitting resources, identifying a mobile device impacted by the external interference from the network issue data, receiving, from the identified mobile device, a channel state information measurements report responsive to a request sent by the channel state engine, receiving, from neighboring mobile devices located proximate to the identified mobile device, channel state information measurements reports responsive to requests sent by the channel state engine, identifying one or more interfered wireless communications transmitting resources based on the channel state information measurements report and the channel state information measurements reports, and determining a location of the external interference using triangulation data from the identified mobile device and the neighboring mobile devices.

20 Claims, 9 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2013/0322277 | A1 | 12/2013 | Vanganuru et al. | |
| 2015/0326463 | A1* | 11/2015 | Solondz | H04L 43/0829 370/252 |
| 2019/0004144 | A1* | 1/2019 | O'Shea | G01S 5/0249 |
| 2025/0030491 | A1* | 1/2025 | Liu | G06F 13/382 |
| 2026/0025176 | A1* | 1/2026 | Panchal | H04B 7/0626 |

FOREIGN PATENT DOCUMENTS

| | | | | |
|---|---|---|---|---|
| EP | 2828984 B1 | * | 11/2018 | H04L 1/0026 |
| EP | 4014607 B1 | * | 12/2025 | H04W 56/001 |
| WO | WO-2018095210 A1 | * | 5/2018 | H04L 1/20 |

* cited by examiner

7000

| **Device** | **1** | | **2** | | **3** | | **4** | | **5** | | **6** |
|---|---|---|---|---|---|---|---|---|---|---|---|
| | CQI | | | | | | | | | | |
| PRB (0-5) | 3 | | 2 | | 4 | | 3 | | 1 | | 2 |
| PRB (6-10) | 2 | | 3 | | 4 | | 2 | | 2 | | 1 |
| | | | | | | | | | | | |
| PRB (260-265) | 11 | | 13 | | 15 | | 12 | | 11 | | 13 |
| PRB (266-272) | 12 | | 14 | | 15 | | 11 | | 12 | | 14 |

FIG. 7

IDENTIFICATION OF EXTERNAL INTERFERENCE IN DOWNLINK DIRECTION IN THE WIRELESS COMMUNICATION NETWORK USING CHANNEL STATE INFORMATION

TECHNICAL FIELD

This disclosure relates to wireless communications. More specifically, this disclosure relates to detection of external interference in a wireless communications network.

BACKGROUND

Wireless communications between mobile devices is enabled by base stations which provide designated wireless coverage areas. These wireless coverage areas are based on various factors, including but not limited, to transmitter specifications, antenna height, frequency, area, geography, and/or topography. Spectral efficiency is an important consideration when providing wireless communications. In order to provide the highest or maximize spectral efficiency in data transmissions, frequency use protection measures are used or defined by regulatory agencies. However, there are many instances where a frequency or frequencies used by the base station(s) in the designated wireless coverage areas are adjacent to or overlapped by non-regular devices in the uplink direction and/or in the downlink direction. That is, these non-regular devices are sources of interference with respect to the designated wireless coverage areas and the frequencies being used in the designated wireless coverage areas. These can be denoted as external interference or external interference sources in contrast to known or internal interference sources based on elements in a wireless communications network, such as but not limited to, the base stations. Internal interference sources are already accounted for by the base stations. However, it can be a challenge for the base stations to identify and account for external interference sources. That is, it is challenging for the base stations to find such instances where the base station frequencies and/or bands are being used by unauthorized participants or unknown equipment. Conventional approaches for identifying external interference sources include performing a detailed drive testing using a spectrum analyzer. This approach is time consuming and expensive. Moreover, by the time the drive testing is started in the field, the external interference may not be present anymore. Therefore, it is often necessary to repeat multiple drive testing activities, which is even more expensive. In addition, the unknown external interference can be different in the uplink and downlink directions.

SUMMARY

Disclosed herein is a system and method for identification of external interference sources in a wireless communication network using channel state information. In implementations, a method includes receiving, by a channel state engine in a service provider system, network issue data indicating external interference on one or more wireless communications transmitting resources, identifying, by the channel state engine, a mobile device impacted by the external interference from the network issue data, receiving, by the channel state engine from the identified mobile device, a channel state information measurements report responsive to a channel state information measurement request sent by the channel state engine, receiving, by the channel state engine from neighboring mobile devices located proximate to the identified mobile device, channel state information measurements reports responsive to channel state information measurement requests sent by the channel state engine, identifying, by the channel state engine, one or more interfered wireless communications transmitting resources based on the channel state information measurements report and the channel state information measurements reports, and determining, by the channel state engine, a location of the external interference using triangulation data from the identified mobile device and the neighboring mobile devices.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

FIG. 7 is a diagram of an example channel state engine results in accordance with embodiments of this disclosure.

DETAILED DESCRIPTION

Figure 1:
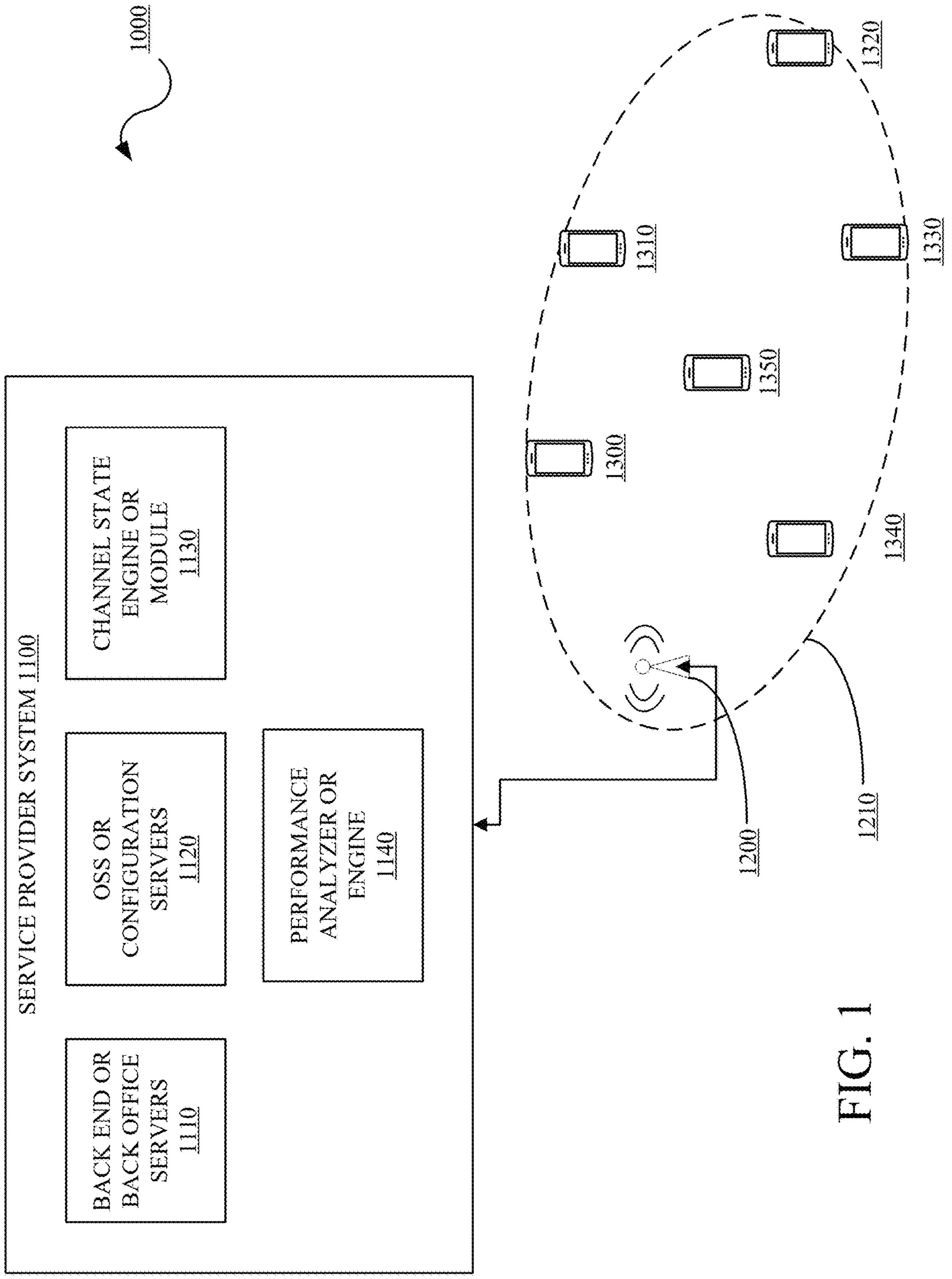
FIG. 1 is a diagram of an example of a wireless communications network in accordance with embodiments of this disclosure.

Reference will now be made in greater detail to embodiments, examples of which are illustrated in the accompanying drawings. Wherever possible, the same reference numerals will be used throughout the drawings and the description to refer to the same or like parts.

As used herein, the terminology "server", "computer", "computing device or platform", or "cloud computing system" includes any unit, or combination of units, capable of performing any method, or any portion or portions thereof, disclosed herein. For example, the "server", "computer", "computing device or platform", or "cloud computing system" may include at least one or more processor(s).

As used herein, the terminology "processor" or "processing circuitry" indicates one or more processors, such as one or more special purpose processors, one or more digital signal processors, one or more microprocessors, one or more controllers, one or more microcontrollers, one or more application processors, one or more central processing units (CPU)s, one or more graphics processing units (GPU)s, one or more digital signal processors (DSP)s, one or more application specific integrated circuits (ASIC)s, one or more application specific standard products, one or more field programmable gate arrays, any other type or combination of integrated circuits, one or more state machines, or any combination thereof.

As used herein, the term "engine" may include software, hardware, or a combination of software and hardware. An engine may be implemented using software stored in the memory subsystem. Alternatively, an engine may be hard-wired into processing circuitry. In some cases, an engine includes a combination of software stored in the memory and hardware that is hard-wired into the processing circuitry.

As used herein, the terminology "memory" indicates any computer-usable or computer-readable medium or device that can tangibly contain, store, communicate, or transport any signal or information that may be used by or in connection with any processor. For example, a memory may be one or more read-only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

As used herein, the term "memory" includes one or more memories, where each memory may be a computer-readable medium. A memory may encompass memory hardware units (e.g., a hard drive or a disk) that store data or instructions in software form. Alternatively or in addition, the memory may include data or instructions that are hard-wired into processing circuitry. The memory may include a single memory unit or multiple joint or disjoint memory units, which each of the multiple joint or disjoint memory units storing all or a portion of the data described as being stored in the memory.

As used herein, the terminology "instructions" may include directions or expressions for performing any method, or any portion or portions thereof, disclosed herein, and may be realized in hardware, software, or any combination thereof. For example, instructions may be implemented as information, such as a computer program, stored in memory that may be executed by a processor to perform any of the respective methods, algorithms, aspects, or combinations thereof, as described herein. For example, the memory can be non-transitory. Instructions, or a portion thereof, may be implemented as a special purpose processor, or circuitry, that may include specialized hardware for carrying out any of the methods, algorithms, aspects, or combinations thereof, as described herein. In some implementations, portions of the instructions may be distributed across multiple processors on a single device, on multiple devices, which may communicate directly or across a network such as a local area network, a wide area network, the Internet, or a combination thereof.

As used herein, the term "application" refers generally to a unit of executable software that implements or performs one or more functions, tasks, or activities. For example, applications may perform one or more functions including, but not limited to, telephony, web browsers, e-commerce transactions, media players, scheduling, management, smart home management, entertainment, and the like. The unit of executable software generally runs in a predetermined environment and/or a processor.

As used herein, the terminology "determine" and "identify," or any variations thereof includes selecting, ascertaining, computing, looking up, receiving, determining, establishing, obtaining, or otherwise identifying or determining in any manner whatsoever using one or more of the devices and methods are shown and described herein.

As used herein, the terminology "example," "the embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "or" is intended to mean an inclusive "or" rather than an exclusive "or." That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from the context to be directed to a singular form.

As used herein, unless explicitly stated otherwise, any term specified in the singular may include its plural version. For example, "a computer that stores data and runs software," may include a single computer that stores data and runs software or two computers—a first computer that stores data and a second computer that runs software. Also "a computer that stores data and runs software," may include multiple computers that together stored data and run software. At least one of the multiple computers stores data, and at least one of the multiple computers runs software.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure and claims. Although aspects, features, and elements are described herein in particular combinations, each aspect, feature, or element may be used independently or in various combinations with or without other aspects, features, and elements.

Further, the figures and descriptions provided herein may be simplified to illustrate aspects of the described embodiments that are relevant for a clear understanding of the herein disclosed processes, machines, and/or manufactures, while eliminating for the purpose of clarity other aspects that may be found in typical similar devices, systems, and methods. Those of ordinary skill may thus recognize that other elements and/or steps may be desirable or necessary to implement the devices, systems, and methods described herein. However, because such elements and steps do not facilitate a better understanding of the disclosed embodiments, a discussion of such elements and steps may not be provided herein. However, the present disclosure is deemed to inherently include all such elements, variations, and modifications to the described aspects that would be known to those of ordinary skill in the pertinent art in light of the discussion herein.

Described herein is a system and method for identification of external interference sources in a wireless communication network using channel state information.

In implementations, the system can determine from performance counters a state or condition of a wireless communications network. In the event that an issue is present, the system can identify mobile devices that are in a general area where external interference may be located. The system can then request, via base stations, the identified mobile devices to make frequency measurements, assign periodicity and type of measurements, analyze the measurements, and determine an estimated location of the source of external interference. In implementations, the identified mobile devices are used to collect the frequency measurements since such frequency measurements can increase the symbol overhead from the spectral bandwidth. As such, use of the identified mobile devices can minimize the impact on the wireless communications network performance.

In implementations, base stations, such as but not limited to, 5G new radio (NR) base stations, can request channel state information (CSI) from the mobile devices. In implementations, measurements of CSI can be configured as periodic, aperiodic, sub-band (partial band), wideband (complete range of frequency bandwidth) and/or combinations thereof. The CSI can include multiple measurements including, but not limited to, channel quality index (CQI) measurements. The CQI can be translated into a range of 1-15, where 1 can represent poor channel quality and/or channel conditions and 15 can represent best channel quality and/or channel conditions. The described system and method can be applied to any wireless communication technologies where bandwidth based channel quality measurements and reporting are supported.

FIG. 1 is a diagram of an example of a wireless communications network and/or architecture 1000 in accordance with embodiments of this disclosure. The wireless communications network 1000 can include, but is not limited to, a service provider system 1100, base station(s) 1200, and mobile devices 1300, 1310, 1320, 1330, 1340, and 1350. The service provider system 1100, the base station(s) 1200, and the mobile devices 1300, 1310, 1320, 1330, 1340, and 1350 can be connected to or be in communication with (collectively "connected to") with each other as described herein. The number of components shown herein are illustrative and there may be more or less in the wireless communications network 1000. The wireless communications network 1000 and the components therein may include other elements which may be desirable or necessary to implement the devices, systems, and methods described herein. However, because such elements and steps do not facilitate a better understanding of the disclosed embodiments, a discussion of such elements and steps may not be provided herein.

The service provider system 1100 can include, but is not limited to, a back office server(s) and/or system 1110, an operational support system (OSS) server(s) and/or configuration server(s) (collectively "configuration server(s)") 1120, a channel state engine and/or module 1130 and/or a performance analyzer and/or engine 1140. One or more of the back office server(s) and/or system 1110, the operational support system (OSS) server(s) and/or configuration server(s) (collectively "configuration server(s)") 1120, the channel state engine and/or module 1130 and/or the performance analyzer and/or engine 1140 can be integrated, distributive, and/or combinations thereof.

The back office server(s) and/or system 1110 can provide, manage, authenticate, and/or otherwise enable the providing of the wireless communications and/or mobile services to a customer(s) and/or user(s) via a mobile device, such as the mobile devices 1300, 1310, 1320, 1330, 1340, and 1350, when connected to the wireless communications network 1000, the base station(s) 1200, and/or combinations thereof. The back office server(s) and/or system 1110 can be connected to the configuration server(s) 1120 and the base station(s) 1200 via a backhaul network.

The configuration server(s) 1120 can be used by a service provider to monitor, control, analyze, and manage the service provider network 1100 and to support management functions such as service provisioning and/or network configuration. The configuration server(s) 1120 can delegate, provision, configure, or initiate configuration of one or more base station(s), such as the base station(s) 1200, other network devices, and/or combinations thereof as described herein. The configuration server(s) 1120 can maintain performance counters with respect to the wireless communications network 1000 and/or components therein such as the base stations. The performance counters can include, but is not limited to, standard radio measurements or statistics thereto, system performance, resource utilization, system events, traffic, latency, RRM statistics, throughput, signal strength, and/or error rates. The configuration server(s) 1120 can collect these performance counters from, for example, the base station(s) 1200.

The base station(s) 1200 may be a node-B, an evolved node-B, and/or like device which enables wireless or radio communications access between, for example, the mobile devices 1300, 1310, 1320, 1330, 1340, and 1350. Each base station(s) 1200 can have one or more sector(s) 1210 which provide wireless communications coverage. The have one or more sector(s) 1210 can cover several square meters or kilometers depending on the configuration. Each sector(s) 1210 can serve a certain number of mobile devices as per a capacity configuration.

The mobile devices 1300, 1310, 1320, 1330, 1340, and 1350 can include, but is not limited to, mobile device(s), smartphone(s), and/or other devices which can provide and/or support access to the wireless communications and/or mobile services as provided by the wireless communications network 1000.

The performance analyzer and/or engine 1140 can access the performance counter information maintained by the configuration server(s) 1120. The performance analyzer and/or engine 1140 can aggregate the performance counter information and generate key performance indicators (KPIs) with respect to throughput, drop rates, traffic management, and/or other network performance indicators. In implementations, the KPIs can be compared to defined performance thresholds to indicate issues with respect to one or more frequency bandwidths. In the event of an issue, the performance analyzer and/or engine 1140 can trigger the channel state engine and/or module 1130.

The channel state engine and/or module 1130 can monitor overall channel quality of all the mobile devices being served by each base station. If the channel quality gets degraded, it can often impact the performance of the network and network devices. Channel quality degradation can include internal network radio conditions and external impact on a given channel(s) (specifically for wide bandwidth radio networks). In implementations, the mobile devices and/or radios therein can be 5 MHz, 10, MHz, . . . , 100 MHz channel bandwidth radios and/or any combinations defined in applicable telecommunications standards, for example.

The channel state engine and/or module 1130 can use CSI measurement reports requested from mobile devices and CQI values in the CSI measurement reports to monitor channel quality. In implementations, the CSI measurement reports and CQI values can be provided in various configurations of physical resource blocks (PRBs) and bandwidths as shown in Table 1 and Table 2. The configurations shown in Table 1 and Table 2 are stated in various European Telecommunications Standards Institute (ETSI) standards documents available at https://www.etsi.org/. Table 1 shows frequency range 1 (FR1) PRB and bandwidth configurations and Table 2 shows frequency range 2 (FR2) PRB and bandwidth configurations, where SCS refers to sub-carrier spacing. With respect to Table 1 and Table 2, each PRB will have 12 sub-carriers for a given frequency. For example, the 100 MHz bandwidth channel will have 273 PRBs of 30 KHz each with a total configurable bandwidth of 98.280 MHz (273×12×30×1000). For larger bandwidths, interference can be on a few sub-carriers or PRBs or can be the entire bandwidth.

TABLE 1

| SCS | 5 MHz | 10 MHz | 15 MHz | 20 MHz | 25 MHz | 30 MHz | 40 MHz | 50 MHz | 60 MHz | 80 MHz | 90 MHz | 100 MHz |
|---|---|---|---|---|---|---|---|---|---|---|---|---|
| 15 kHz | 25 | 52 | 79 | 106 | 133 | 160 | 216 | 270 | — | — | — | — |
| 30 kHz | 11 | 24 | 38 | 51 | 65 | 78 | 106 | 133 | 162 | 217 | 245 | 273 |
| 60 kHz | NA | 11 | 18 | 24 | 31 | 38 | 51 | 65 | 79 | 107 | 121 | 135 |

TABLE 2

| SCS | 50 MHz | 100 MHz | 200 MHz | 400 MHz |
|---|---|---|---|---|
| 60 kHz | 66 | 132 | 264 | — |
| 120 kHz | 32 | 66 | 132 | 264 |

In implementations, the CSI measurement reports can be reported to the configuration server(s) 1120 on a periodic basis (defined sub-frames at a specific interval) or on an aperiodic basis (on a request or on-demand basis). The CSI measurement reports can be configured to be for wideband (entire bandwidth) or sub-band (specific PRBs or subcarriers). As the CSI measurement reports occupy the symbols of a given bandwidth as per the configuration, it is necessary to adjust these configurations as per requirement (not uniform) across the network.

Figure 2:
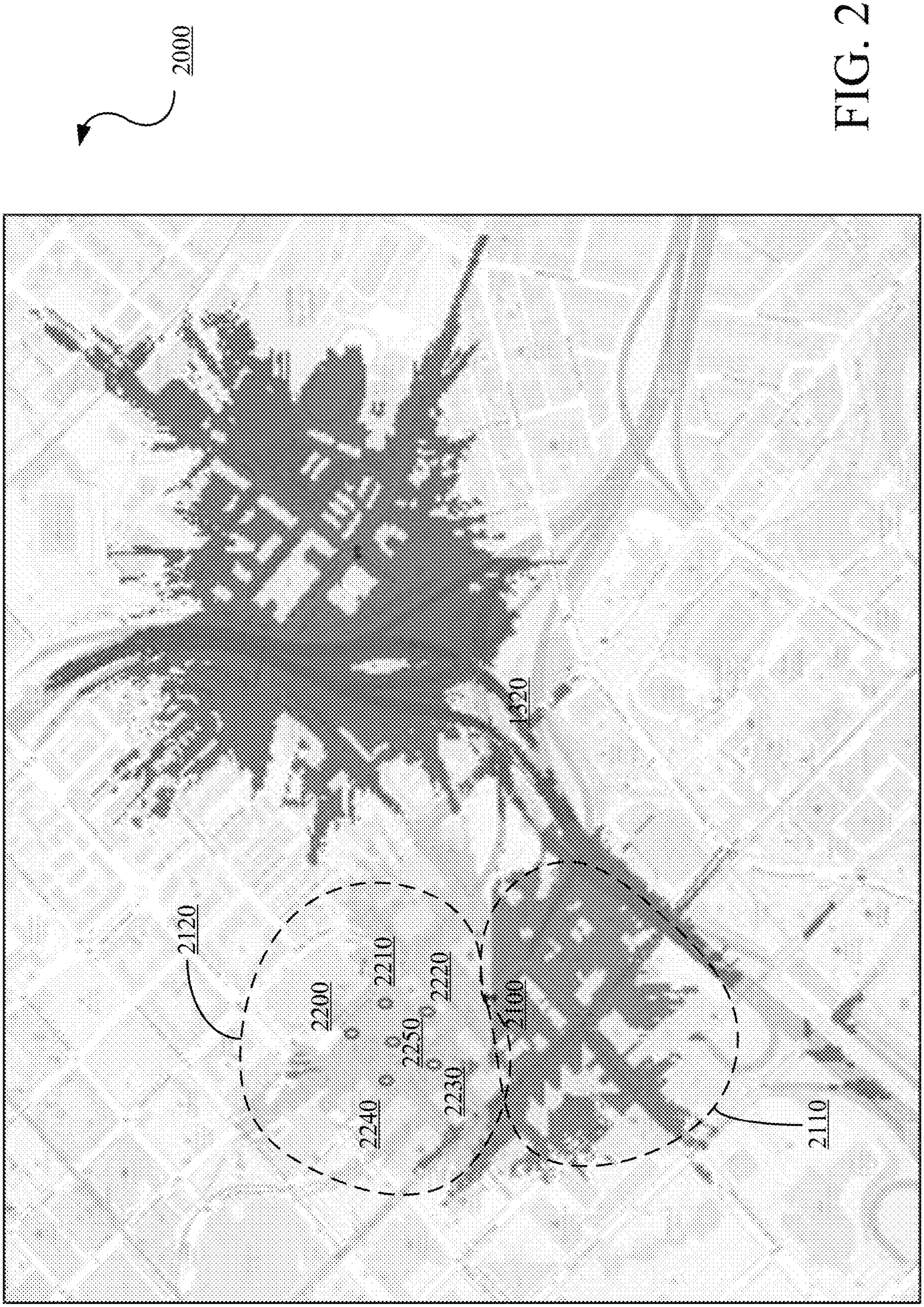
FIG. 2 is a diagram of an example of a wireless communications network showing a base station with two sectors in accordance with embodiments of this disclosure.

FIG. 2 is a diagram of an example of a wireless communications network 2000 showing a base station 2100 with two sectors 2110 and 2120 in accordance with embodiments of this disclosure. In implementations, mobile devices 2200, 2210, 2220, 2230, 2240, and 2250 can be provided wireless communications services via sector 2120 of the base station 2100.

Referring now to both FIG. 1 and FIG. 2, the performance analyzer and/or engine 1140 can monitor the health of a wireless communications network, such as the wireless communications network 1000 and/or 2000, on a defined interval basis. In implementations, the defined interval basis can be 5 minutes, 15 minutes, 60 minutes, and so on. In the event that abnormal performance is detected based on one or more KPIs not meeting the defined performance thresholds, the performance analyzer and/or engine 1140 can inform the channel state engine and/or module 1130 about the health of the wireless communications network.

The channel state engine and/or module 1130 can analyze the channel conditions of the mobile devices such as the mobile devices 2200, 2210, 2220, 2230, 2240, and 2250. The channel state engine and/or module 1130 can identify specific mobile device(s) contributing to the lower performance of a given base station, such as the base station 2100. In implementations, the channel conditions for all the mobile devices can be poor. In implementations, the channel conditions for one or more of the mobile devices in the area are poor. In implementations, in a large bandwidth cell scenario, the impact can be on partial frequency bands and/or a complete frequency band.

The channel state engine and/or module 1130 can request CSI measurement reports from the mobile device(s) which have been identified as contributing to the poor performance of the wireless communications network including nearby mobile devices served by neighboring base stations. For example, the mobile device(s) can be one or more of the mobile devices 2200, 2210, 2220, 2230, 2240, and 2250. The channel state engine and/or module 1130 can send the request to the one or more of the mobile device(s) 2200, 2210, 2220, 2230, 2240, and 2250 via the configuration server(s) 1120 and the base station 2100.

Figure 3:
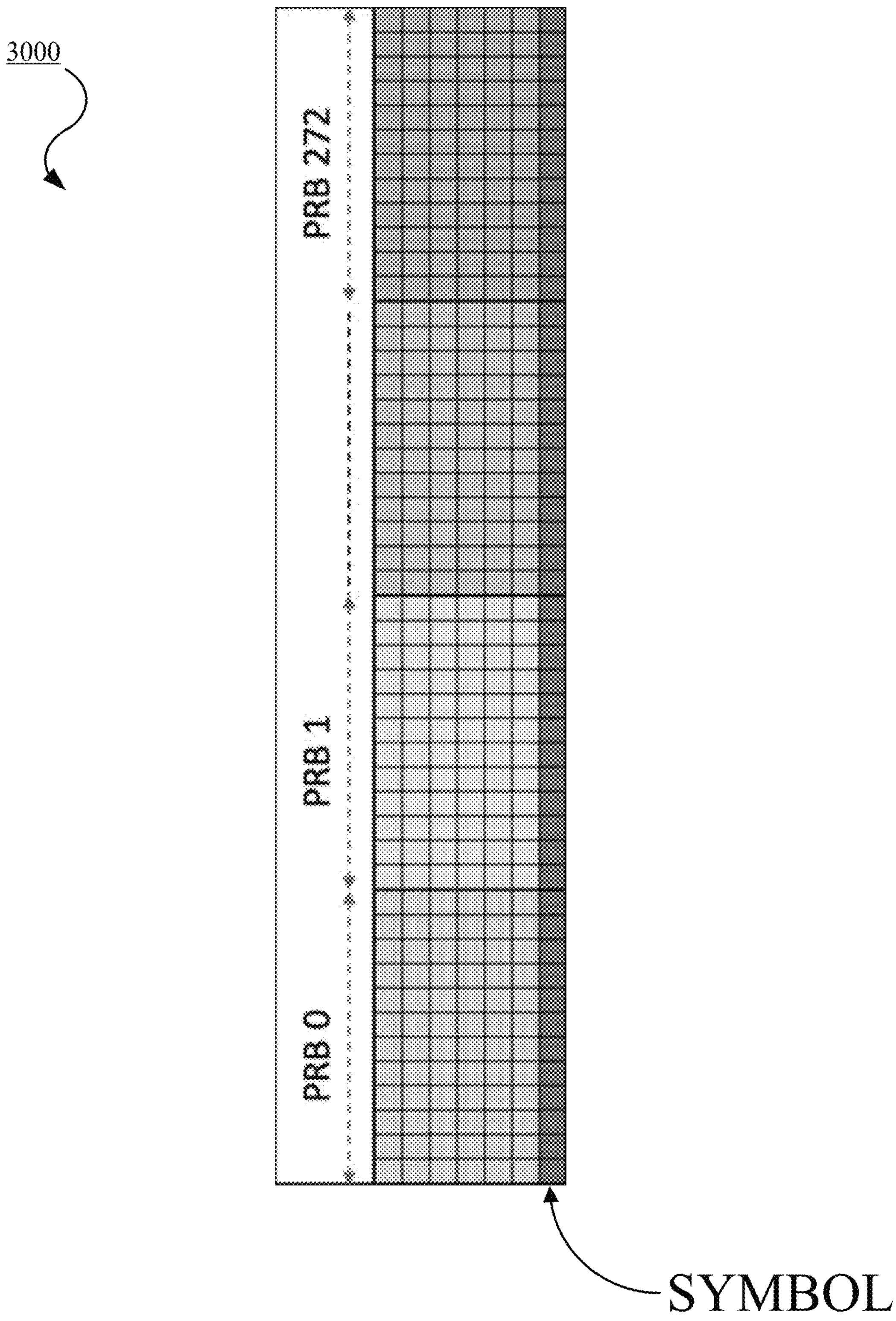
FIG. 3 is a diagram of channel state information requests for wideband and sub-band in accordance with embodiments of this disclosure.

In implementations, the channel state engine and/or module 1130 can request CSI measurement reports for sub-band measurements at specified intervals. The channel state engine and/or module 1130 can attempt to decode or determine if the wireless communications network issue is at a specific sub-carrier or frequency. If the channel state engine and/or module 1130 is able to identify the specific sub-carrier or frequency, then the channel state engine and/or module 1130 can proceed to the next steps as described herein. If the channel state engine and/or module 1130 is unable to identify the specific sub-carrier or frequency, then the channel state engine and/or module 1130 can request CSI measurement reports for wideband reporting for a specific duration. FIG. 3 is a diagram of channel state information requests for wideband and sub-band in accordance with embodiments of this disclosure. FIG. 3 shows a CSI configuration for a specific symbol for the entire bandwidth (all PRBs). For sub-band measurement requests, specific PRBs (e.g., PRB 0, PRB 1, . . . , PRB 272) will be reported in the CSI measurement report. In this example, 100 MHz channel bandwidth and 30 KHz sub carrier spacing is assumed. The CSI measurement report can vary based on channel bandwidth and sub carrier spacing.

The channel state engine and/or module 1130 can receive the CSI measurement reports from the identified mobile devices via the base station 2100 and the configuration server(s) 1120. In implementations, this can be from sub-band measurements or wideband measurements, as appropriate and applicable. The channel state engine and/or module 1130 can analyze the CQI values reported in the CSI measurement reports with respect to predicted and/or defined values. In implementations, the channel state engine and/or module 1130 can identify neighbor mobile devices (which can be from the same base station or neighboring base stations) and trigger the same reporting for all of them. In implementations, the neighbor mobile devices can be within a 100 meter circle from the initial identified mobile device(s). The additional neighbor mobile devices can assist in identification of the source of the interference in the downlink direction. By limiting the number of additional neighbor mobile devices, this can assist in maintaining the service quality and resource demand inline to avoid user experience impact.

If all of the mobile devices, i.e., the initial identified mobile device(s) and the additional neighbor mobile devices, are reporting specific PRBs or a frequency range that is being interfered by an interference source, then channel state engine and/or module 1130 can report it to a scheduler of the base station 2100 to avoid allocating those PRBs. In the absence of the described method, a base station would have to be turned off one or more times to avoid user experience impact. However, the described method stops or prevents allocation of the PRBs, freqeunc(ies), and/or sub-carrier(s) that are being subject to external interference (collectively "interfered resources") and permits use of the remaining PRBs, freqeunc(ies), and/or sub-carrier(s) (collectively "non-interfered, clean, useable, and/or remaining resources") to maintain, provide, or achieve the best user experience. The method can improve spectral efficiency without wireless communications network service being impacted.

Figure 4:
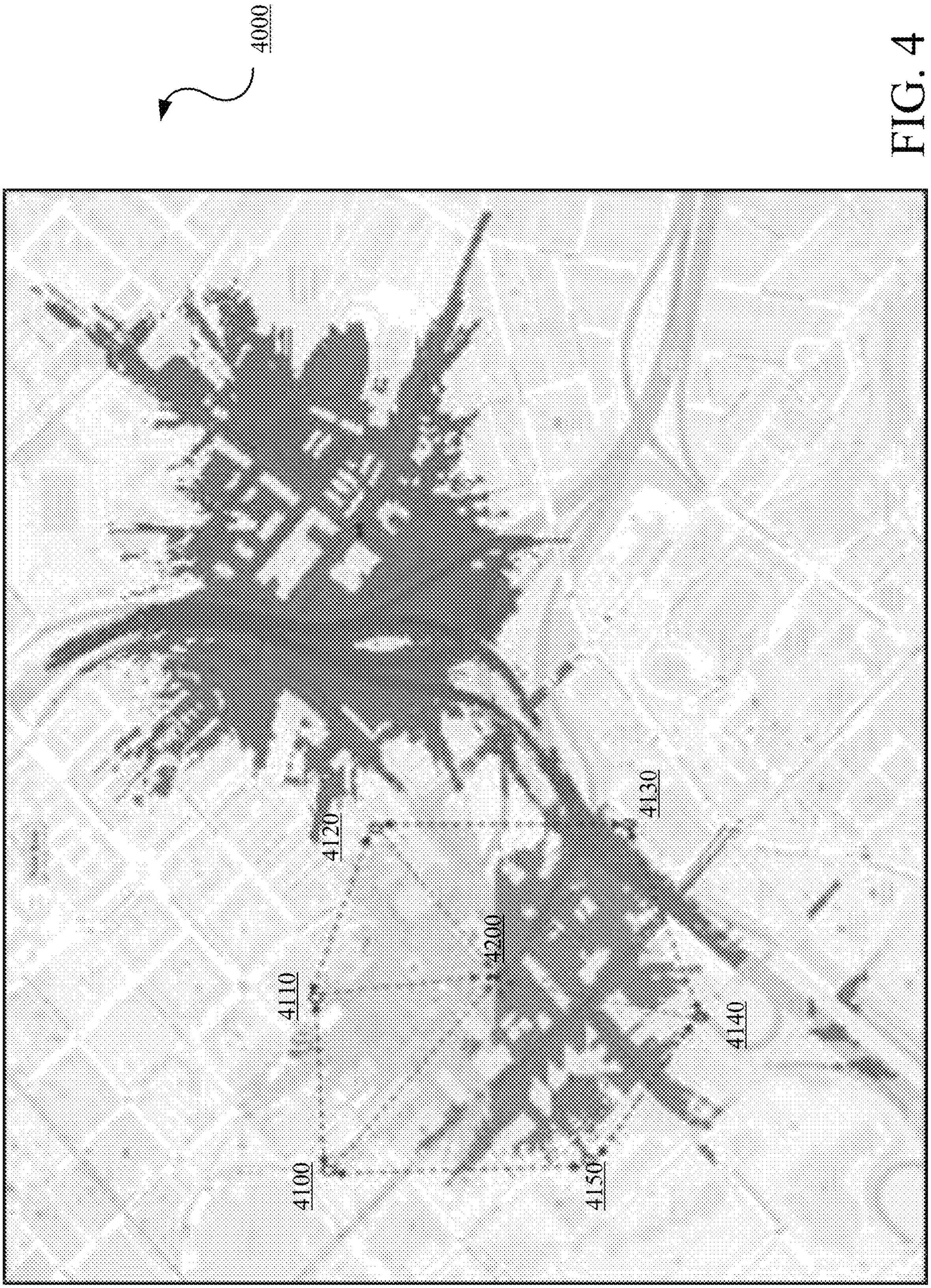
FIG. 4 is a diagram of an example triangulation in a wireless communications network in accordance with embodiments of this disclosure.

In implementations, the channel state engine and/or module 1130 can use triangulation to determine a location of the external interference using the initial identified mobile device(s) and the additional neighbor mobile devices. In implementations, the triangulation can be done using an angle of the interference as seen by each of the mobile devices, an intensity of the interference as seen by each of the mobile devices, and/or other techniques. An illustrative example is shown in FIG. 4, which is a diagram of an example triangulation in a wireless communications network 4000 in accordance with embodiments of this disclosure. Mobile devices 4100, 4110, 4120, 4130, 4140, and 4150 are used to triangulate a source of external interference 4200. The channel state engine and/or module 1130 can report the location of the external interference to service provider system personnel to confirm the nature of the external interference and report same to regulatory entities.

Figure 5:
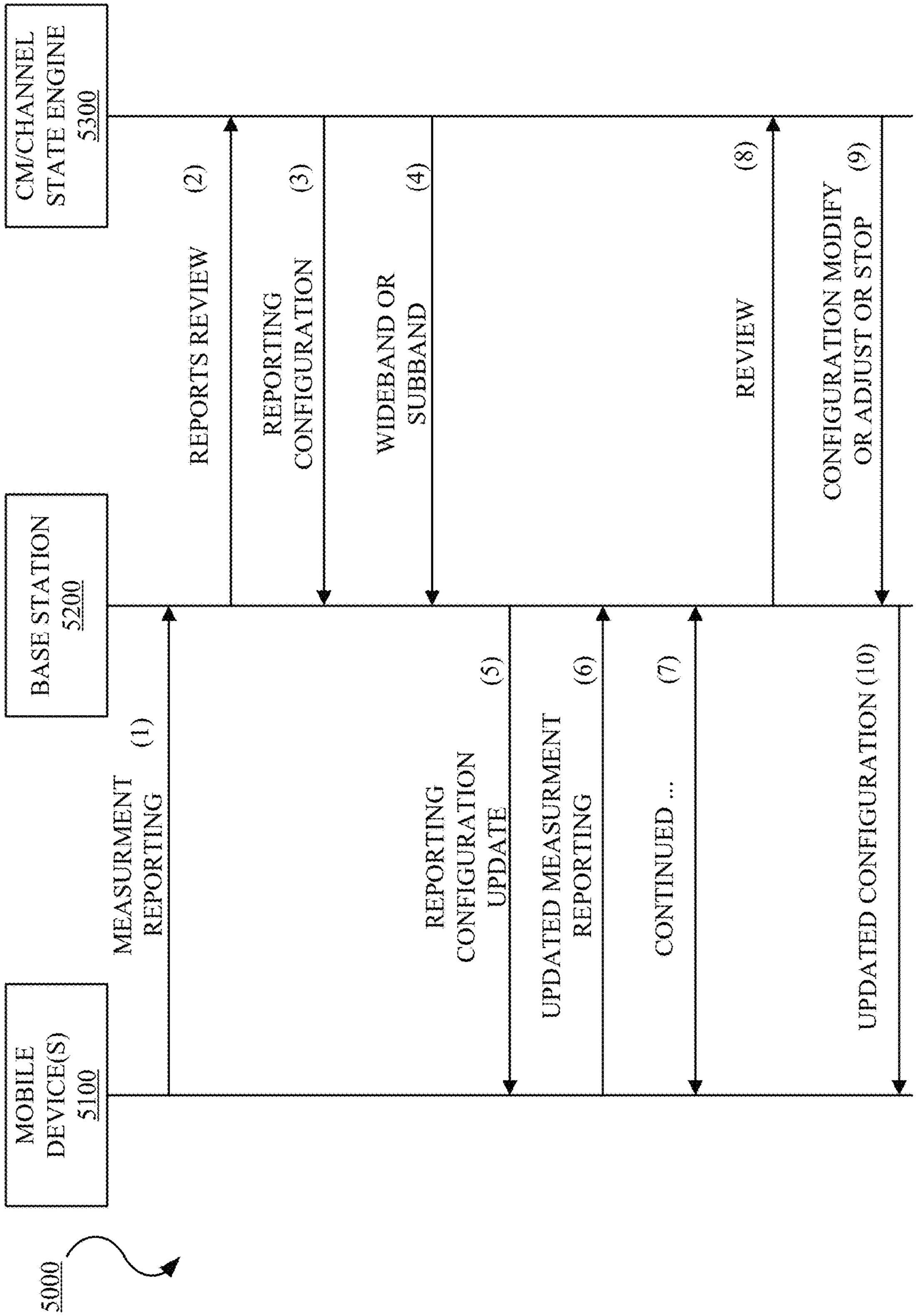
FIG. 5 is a diagram of an example flow for external interference detection in a wireless communications network in accordance with embodiments of this disclosure.

FIG. 5 is a diagram of an example flow 5000 for measurement request for external interference detection in a wireless communications network in accordance with embodiments of this disclosure. The flow 5000 is implemented and/or performed by one or more mobile device(s) 5100, a base station 5200, and a configuration server and channel state engine and/or module 5300. In this instance, the one or more mobile device(s) 5100 can include initially identified mobile device(s) and/or neighbor mobile device(s).

In this instance, the channel state engine and/or module of the configuration server and channel state engine and/or module 5300 has been triggered by a performance engine that an interference issue exists. The channel state engine and/or module of the configuration server and channel state engine and/or module 5300 can initially determine mobile device(s) contributing to low performance in a wireless communications network. The initially identified mobile device(s) of the one or more mobile device(s) 5100 can send CSI measurement reports to the base station 5200 (1), which in turn can send the measurement reports to the configuration server and channel state engine and/or module 5300 for review by the channel state engine and/or module (2). The configuration server and channel state engine and/or module 5300 can send configuration information including reporting intervals (3), and whether it is sub-band measurement reporting or wideband reporting (4), to the base station 5200, which in turn sends the updated configuration information (5) and the measurement reporting (6) to the initially identified mobile device(s) of the one or more mobile device(s) 5100. The initially identified mobile device(s) of the one or more mobile device(s) 5100 can report measurements and apply updates provided by the configuration server and channel state engine and/or module 5300 via the base station 5200, as appropriate (7). In implementations, the channel state engine and/or module of the configuration server and channel state engine and/or module 5300 can identify neighbor mobile device(s) and provide the same configuration information and measurement reporting to the neighbor mobile device(s). The channel state engine and/or module of the configuration server and channel state engine and/or module 5300 can review the measurement reports from the initially identified mobile device(s) and/or the neighbor mobile device(s), as appropriate and applicable (8). The channel state engine and/or module of the configuration server and channel state engine and/or module 5300 can adjust or stop once the reporting is completed and the analysis is finalized (9) and (10).

Figure 6:
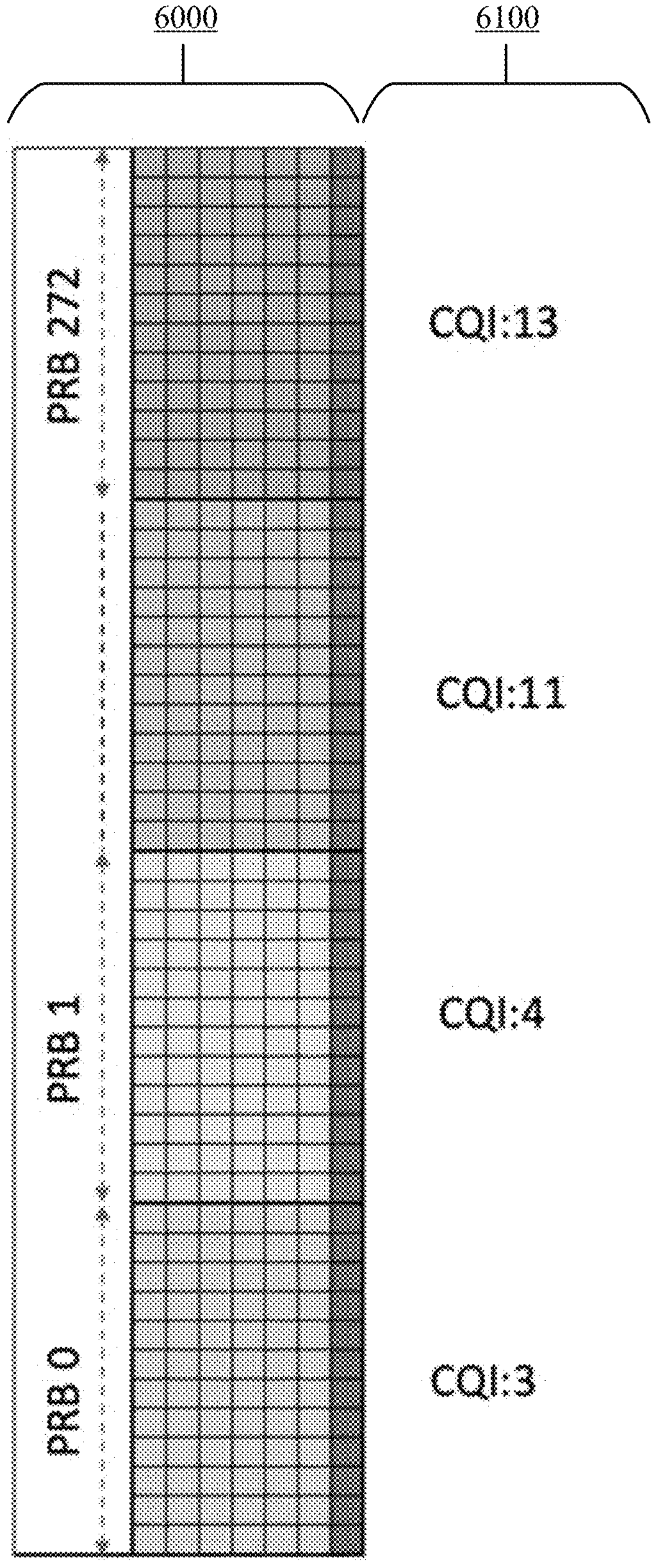
FIG. 6 is a diagram of an example channel quality results in accordance with embodiments of this disclosure.

Reference is now also made to FIG. 6, which is a diagram of example CSI request 6000 with channel quality results 6100 for downlink bandwidth in accordance with embodiments of this disclosure. In this illustrative example, the base station allocates the resources and sends a request for the CSI measurement report with CQI per channel bandwidth. As shown, the PRB0 allocation has a CQI measurement of 3, PRB1 has a CQI value of 4, PRB 271 has a CQI value of 11, and PRB 272 has a CQI value of 13. The CQI values for PRB0 and PRB1 indicate interference as compared to the CQI values for PRB 271 and PRB 272. In view of the CQI values, the channel state engine and/or module can identify neighbor mobile devices and request these neighbor mobile devices to perform the same CSI measurements and the report the channel quality results. In implementations, the channel state engine and/or module employ machine learning techniques which can be trained to find the closest mobile devices with poor channel quality. It is noted that base stations proximate to each other can coordinate use of resources to avoid intra-base station interference (internal interference in contrast to external interference).

In the event that the neighbor mobile devices detect similar interference pattern and provide the same channel quality results, the channel state engine and/or module can instruct the associated base station(s), via the configuration server, to avoid allocating those interfered resources to mobile devices in the location and/or area to avoid poor quality results. The channel state engine and/or module can indicate that those interfered resources have poor channel quality. Moreover, allocation of the non-interfered resources can help improve data rate and service quality. Consequently, the system and method can improve service quality and detect external system interference without the need for drive testing and scanner measurements.

Reference is now also made to FIG. 7, which is a diagram of example CSI and/or CQI results 7000 in accordance with embodiments of this disclosure. The CSI and/or CQI results 7000 includes CQI results for multiple mobile devices for different PRBs in accordance with embodiments of the disclosure. As shown, PRB (0-5) and (6-10) have low CQI values in the range of 1-4, which indicate poor channel quality in the downlink direction in that area. In contrast, PRB (260-265) and PRB (266-272) have CQI values in the range of 11-15, which indicates there is less impact on these frequencies and/or sub-carriers from the external interference. The channel state engine and/or module can triangulate a source of the external interference. The channel state engine and/or module can instruct the base station(s) to avoid allocation of these interfered resources in the determined location.

Figure 8:
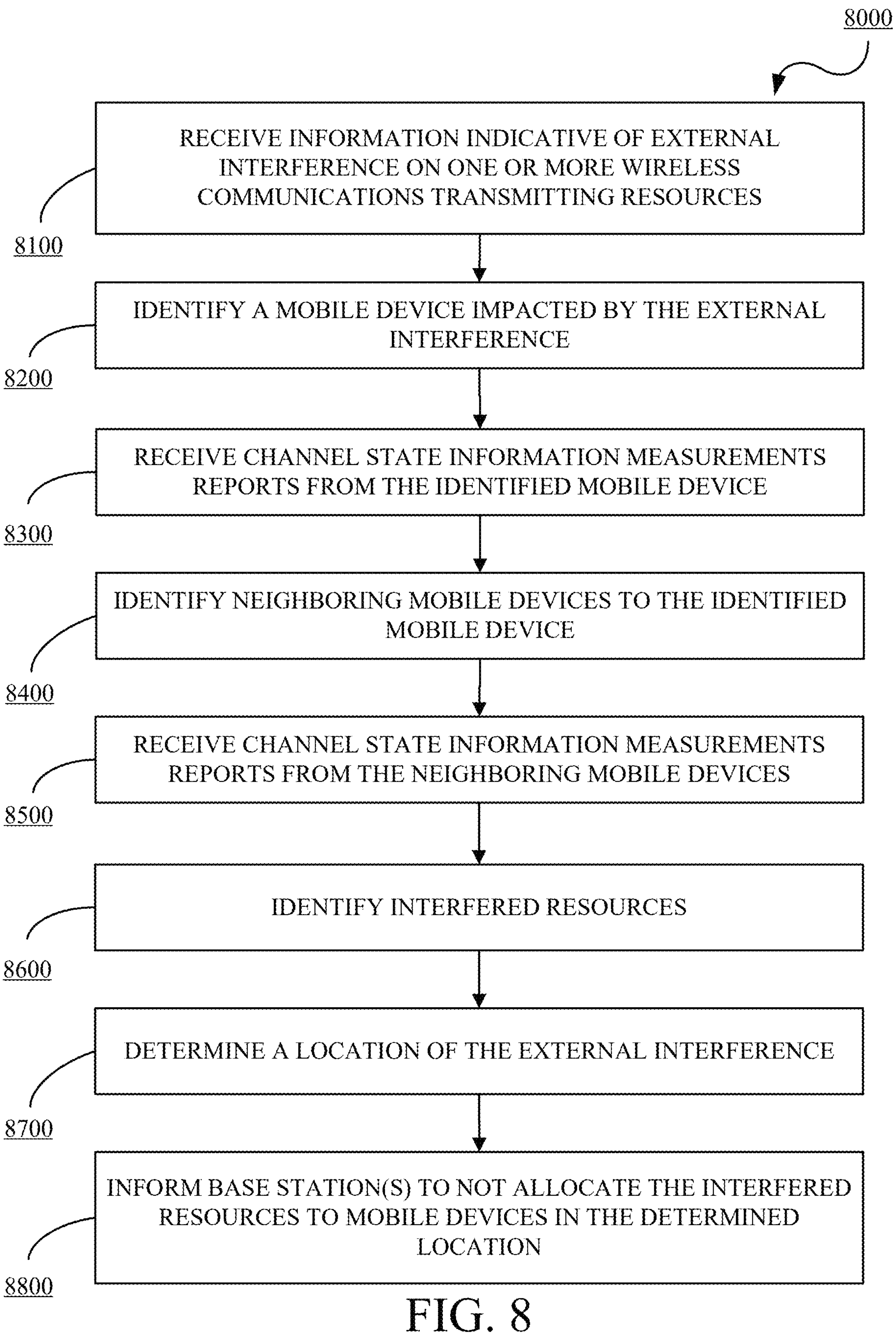
FIG. 8 is a flowchart of an example method for external interference detection in accordance with embodiments of this disclosure.

FIG. 8 is a flowchart of an example method 8000 for external interference identification using CSI and/or CQI in accordance with embodiments of this disclosure. The method 8000 includes: receiving 8100 information indicative of external interference on one or more wireless communications transmitting resources; identifying 8200 a mobile device impacted by the external interference; receiving 8300 channel state information measurements reports from the identified mobile device; identifying 8400 neighboring mobile devices to the identified mobile device; receiving 8500 channel state information measurements reports from the neighboring mobile devices; identifying 8600 interfered resources; determining 8700 a location of the external interference; and informing 8800 base station(s) to not allocate the interfered resources to mobile devices in the determined location. The method 8000 can be implemented, for example, in or by components described with respect to FIGS. 1-7 in conjunction with any of the flows described with respect to FIG. 5, as appropriate and applicable.

The method 8000 includes receiving 8100 information indicative of external interference on one or more wireless communications transmitting resources. A performance analyzer can access network performance data maintained in a configuration server. The performance analyzer can aggregate the network performance data and generate one or more key performance indicators from the network performance data. The performance analyzer can determine if one or more of the key performance indicators falls outside or does not meet a respective defined performance threshold. In the event that one or more of the key performance indicators does fall outside or does not meet a respective defined performance threshold, then the performance analyzer can notify a channel state engine that one or more wireless communications transmitting resources, i.e., PRBs, a frequency band, and/or a sub-carrier, has poor quality and/or performance. The performance analyzer can provide, but not limited to, the network performance data, the aggregated network performance data, the key performance indicators, and/or combinations thereof (collectively "network issue data") to the channel state engine.

The method 8000 includes identifying 8200 a mobile device impacted by the external interference. The channel state engine can review the network issue data and identify a mobile device impacting the network performance and/or showing signs of external interference. The channel state engine can send a request and/or a message to the mobile device, via a base station serving the mobile device, to make channel state information measurements. The request and/or a message can include configuration information including, but not limited to, measurement reporting interval information and measurement reporting type. In implementations, the measurement reporting interval can be periodic reporting, aperiodic reporting, and/or combinations thereof. In implementations, the measurement reporting type can be sub-band measurement reporting and/or wide-band measurement reporting.

The method 8000 includes receiving 8300 channel state information measurements reports from the identified mobile device. The identified mobile device can make the channel state information measurements in accordance with the configuration information sent by the channel state engine. The channel state engine can receive and review the channel state information measurements from the identified mobile device via the base station.

The method 8000 includes identifying 8400 neighboring mobile devices to the identified mobile device. The channel state engine can identify neighboring mobile devices based on a location of the identified mobile device. In implementations, the neighboring mobile devices may be impacted by and/or subject to the external interference. In implementations, the neighboring mobile devices are selected based on a greater probability of being subject to the external interference than other mobile devices. In implementations, machine learning techniques can be used to determine the neighboring mobile devices. In implementations, the neighboring mobile devices can be from the same base station or neighboring base stations. The channel state engine can send a message with the same configuration information to the identified neighboring mobile device, via the base station, to make channel state information measurements.

The method 8000 includes receiving 8500 channel state information measurements reports from the neighboring mobile devices. The channel state engine can receive and review the channel state information measurements from the identified neighboring mobile devices. In implementations, the channel state engine can review the channel quality information in the channel state information measurements. In implementations, the sending of configuration information and receiving channel state information measurements can continue until the channel state engine has completed the external interference analysis.

The method 8000 includes identifying 8600 interfered resources. The channel state engine can determine from the channel state information measurements and/or the channel quality information in the channel state information measurements received from the identified mobile device and the identified neighboring mobile devices which PRB(s), which frequency band(s), and/or which sub-carrier(s) are being impacted by the external interference, i.e., the interfered resources. In implementations, this can be based on a value of the channel quality information.

The method 8000 includes determining 8700 a location of the external interference. In event that external interference is confirmed from the channel state information measurements, the channel state engine can triangulate a location of the external interference by using data from the identified mobile device and the identified neighboring mobile devices. In implementations, the data can include, but is not limited to, angle at which interfering signal is received, intensity of interfering signal, and/or combinations thereof. In implementations, the triangulated location of the external interference can be sent to service provider personnel to confirm the source of the external interference using a drive by and scanning equipment.

The method 8000 includes informing 8800 base station(s) to not allocate the interfered resources to mobile devices in the determined location. In implementations, the channel state engine can inform the base station and other base stations to not assign (e.g., forego, halt, and/or suspend) the interfered resources to mobile devices near or at the triangulated location of the external interference. That is, the base station and other base stations can assign remaining resources not affected by the external interference.

Figure 9:
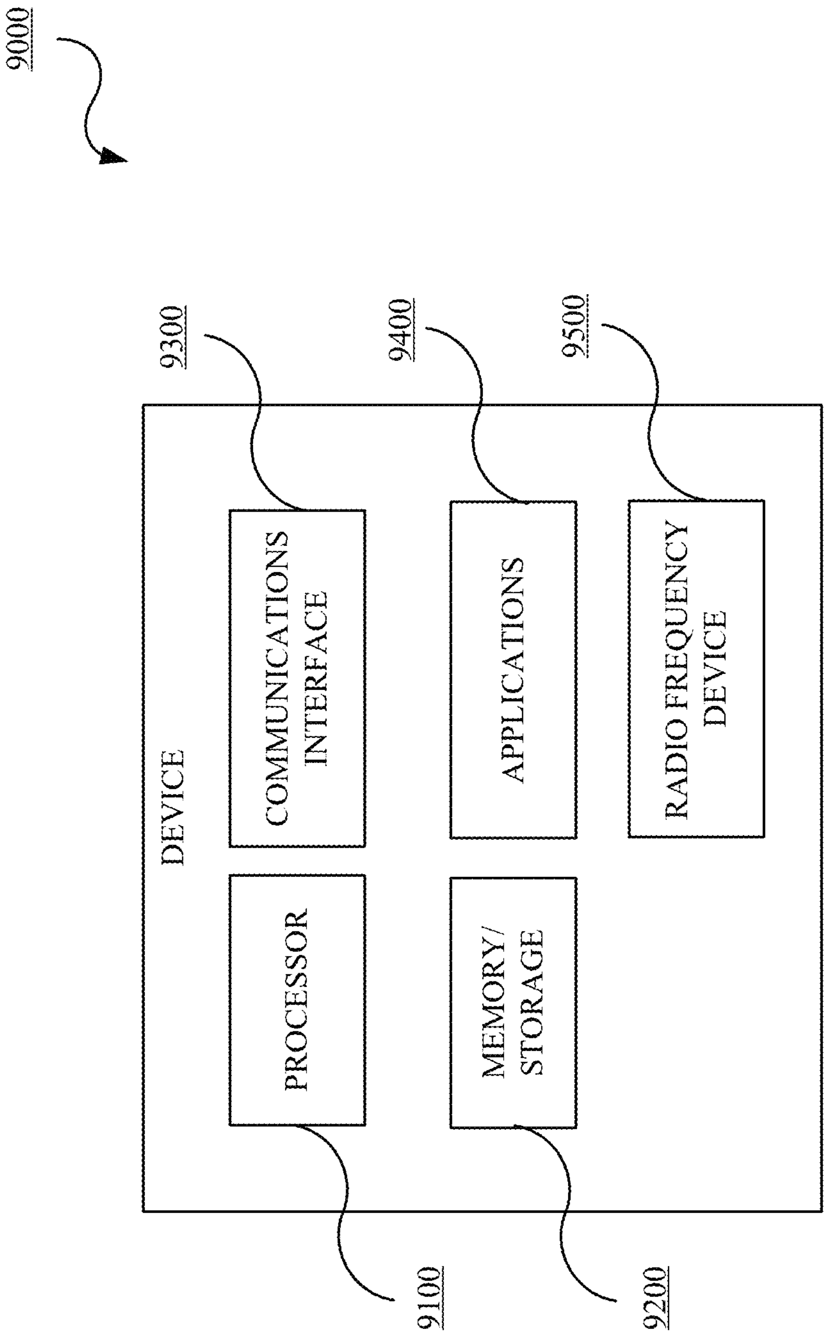
FIG. 9 is a block diagram of an example of a device in accordance with embodiments of this disclosure.

FIG. 9 is a block diagram of an example of a device 9000 in accordance with embodiments of this disclosure. The device 9000 may include, but is not limited to, a processor 9100, a memory/storage 9200, a communication interface 9300, applications 9400, and, if needed, a radio frequency device 9500. The device 9000 may include or implement, for example, the components described with respect to FIGS. 1-7. The applicable or appropriate flows, techniques, or methods described herein may be stored in the memory/storage 9200 and executed by the processor 9100 in cooperation with the memory/storage 9200, the communications interface 9300, the applications 9400, and the radio frequency device 9500 (when applicable), as appropriate. The device 9000 may include other elements which may be desirable or necessary to implement the devices, systems, and methods described herein. However, because such elements and steps do not facilitate a better understanding of the disclosed embodiments, a discussion of such elements and steps may not be provided herein.

Disclosed herein is a method for identification of external interference sources in a wireless communication network using channel state information. In implementations, the method includes receiving, by a channel state engine in a service provider system, network issue data indicating external interference on one or more wireless communications transmitting resources, identifying, by the channel state engine, a mobile device impacted by the external interference from the network issue data, receiving, by the channel state engine from the identified mobile device, a channel state information measurements report responsive to a channel state information measurement request sent by the channel state engine, receiving, by the channel state engine from neighboring mobile devices located proximate to the identified mobile device, channel state information measurements reports responsive to channel state information measurement requests sent by the channel state engine, identifying, by the channel state engine, one or more interfered wireless communications transmitting resources based on the channel state information measurements report and the channel state information measurements reports, and determining, by the channel state engine, a location of the external interference using triangulation data from the identified mobile device and the neighboring mobile devices.

In implementations, the method further includes informing, by the channel state engine, one or more base stations to forego allocating the one or more interfered wireless communications transmitting resources to mobile devices that are proximate to or are at the determined location of the external interference. In implementations, the one or more interfered wireless communications transmitting resources are one or more physical resource blocks. In implementations, the one or more interfered wireless communications transmitting resources are one or more sub-carriers. In implementations, the one or more interfered wireless communications transmitting resources are one or more frequency bands. In implementations, the method further includes identifying, by the channel state engine, the neighboring mobile devices based on at least a location of the identified mobile device. In implementations, the neighboring mobile devices have a higher probability of being subject to the external interference than other mobile devices. In implementations, the method further includes identifying, by the channel state engine using machine learning techniques, the neighboring mobile devices. In implementations, the channel state information measurement request includes measurement reporting interval information and measurement reporting type. In implementations, the method further includes generating, by a performance analyzer, key performance indicators from network performance data maintained in a configuration server, comparing, by the performance analyzer, the key performance indicators against key performance thresholds, and sending, by the performance analyzer to the channel state engine, the network issue data when one or more key performance indicators are out of range with a respective key performance threshold. In implementations, the triangulation data includes an angle at which an interference signal is received by a mobile device. In implementations, the triangulation data includes an intensity at which an interference signal is received by a mobile device.

Disclosed herein is a system and method for identification of external interference sources in a wireless communication network using channel state information. In implementations, a service provider system includes a channel state engine, and a performance engine configured to trigger the channel state engine when network performance data indicates a presence of external interference on least one transmitting resource. In response to the trigger, the channel state engine is configured to determine which mobile device has quality of service issues, receive, from the determined mobile device, channel state information measurements report responsive to a request, receive, from neighboring mobile devices, channel state information measurements reports responsive to requests sent to each of the neighboring mobile devices, determine one or more interfered transmitting resources based on the channel state information measurements report and the channel state information measurements reports, and locate the external interference using triangulation data from the determined mobile device and the neighboring mobile devices.

In implementations, the channel state engine is further configured to instruct one or more base stations to suspend allocation of the one or more interfered transmitting resources to mobile devices that are proximate to or are at a location of the external interference. In implementations, the one or more interfered transmitting resources are one or more of one or more physical resource blocks, one or more sub-carriers, and one or more frequency bands. In implementations, the channel state engine is further configured to identify the neighboring mobile devices based on having a higher probability of being subject to the external interference than other mobile devices. In implementations, the request includes measurement reporting interval information and measurement reporting type. In implementations, the performance engine is further configured to formulate key performance indicators from the network performance data maintained in a configuration server, and send the trigger when one or more key performance indicators fail to meet a respective key performance threshold. In implementations, the triangulation data is at least one of an angle at which an interference signal is received by a mobile device or an intensity at which an interference signal is received by a mobile device.

Disclosed herein is a system and method for identification of external interference sources in a wireless communication network using channel state information. In implementations, a method includes triggering, a channel state engine, when network performance data indicates a presence of external interference on least one transmitting resource, determining, by the channel state engine, which mobile device has quality of service issues, receiving, by the channel state engine from the determined mobile device, channel state information measurements report responsive to a request, receiving, by the channel state engine from neighboring mobile devices, channel state information measurements reports responsive to requests sent to each of the neighboring mobile devices, determining, by the channel state engine, one or more interfered transmitting resources based on the channel state information measurements report and the channel state information measurements reports, locating, by the channel state engine, the external interference using triangulation data from the determined mobile device and the neighboring mobile devices, and instructing, by the channel state engine, one or more base stations to halt allocation of the one or more interfered transmitting resources to mobile devices that are proximate to or are at a location of the external interference.

Although some embodiments herein refer to methods, it will be appreciated by one skilled in the art that they may also be embodied as a system or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "processor," "device," or "system." Furthermore, aspects may take the form of a computer program product embodied in one or more the computer readable mediums having the computer readable program code embodied thereon. For example, the computer readable mediums can be non-transitory. Any combination of one or more computer readable mediums may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to CDs, DVDs, wireless, wireline, optical fiber cable, RF, etc., or any suitable combination of the foregoing.

As used herein, the term "computer-readable medium" encompasses one or more computer-readable media. A computer-readable medium may include any storage unit (or multiple storage units) that store data or instructions that are readable by processing circuitry. A computer-readable medium may include, for example, at least one of a data repository, a data storage unit, a computer memory, a hard drive, a disk, or a random access memory. A computer-readable medium may include a single computer-readable medium or multiple computer-readable media. A computer-readable medium may be a transitory computer-readable medium or a non-transitory computer-readable medium.

Computer program code for carrying out operations for aspects may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects are described herein with reference to flowchart illustrations and/or block diagrams of methods, apparatus (systems) and computer program products according to embodiments. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowcharts and block diagrams in the figures illustrate the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures.

While the disclosure has been described in connection with certain embodiments, it is to be understood that the disclosure is not to be limited to the disclosed embodiments but, on the contrary, is intended to cover various modifications, combinations, and equivalent arrangements included within the scope of the appended claims, which scope is to be accorded the broadest interpretation so as to encompass all such modifications and equivalent structures as is permitted under the law.

What is claimed is:

1. A method for identifying external interference in a wireless communications network, the method comprising:
receiving, by a channel state engine in a service provider system, network issue data indicating external interference on one or more wireless communications transmitting resources;
identifying, by the channel state engine, a mobile device impacted by the external interference from the network issue data;
receiving, by the channel state engine from the identified mobile device, a channel state information measurements report responsive to a channel state information measurement request sent by the channel state engine;
receiving, by the channel state engine from neighboring mobile devices located proximate to the identified mobile device, channel state information measurements reports responsive to channel state information measurement requests sent by the channel state engine;
identifying, by the channel state engine, one or more interfered wireless communications transmitting resources based on the channel state information measurements report and the channel state information measurements reports; and
determining, by the channel state engine, a location of the external interference using triangulation data from the identified mobile device and the neighboring mobile devices.

2. The method of claim 1, further comprising:
informing, by the channel state engine, one or more base stations to forego allocating the one or more interfered wireless communications transmitting resources to mobile devices that are proximate to or are at the determined location of the external interference.

3. The method of claim 2, wherein the one or more interfered wireless communications transmitting resources are one or more physical resource blocks.

4. The method of claim 2, wherein the one or more interfered wireless communications transmitting resources are one or more sub-carriers.

5. The method of claim 2, wherein the one or more interfered wireless communications transmitting resources are one or more frequency bands.

6. The method of claim 1, further comprising:
identifying, by the channel state engine, the neighboring mobile devices based on at least a location of the identified mobile device.

7. The method of claim 6, wherein the neighboring mobile devices have a higher probability of being subject to the external interference than other mobile devices.

8. The method of claim 1, further comprising:
identifying, by the channel state engine using machine learning techniques, the neighboring mobile devices.

9. The method of claim 1, wherein the channel state information measurement request includes measurement reporting interval information and measurement reporting type.

10. The method of claim 1, further comprising:
generating, by a performance analyzer, key performance indicators from network performance data maintained in a configuration server;
comparing, by the performance analyzer, the key performance indicators against key performance thresholds; and
sending, by the performance analyzer to the channel state engine, the network issue data when one or more key performance indicators are out of range with a respective key performance threshold.

11. The method of claim 1, wherein the triangulation data includes an angle at which an interference signal is received by a mobile device.

12. The method of claim 1, wherein the triangulation data includes an intensity at which an interference signal is received by a mobile device.

13. A service provider system, comprising:
a channel state engine;
a performance engine configured to trigger the channel state engine when network performance data indicates a presence of external interference on least one transmitting resource; and
in response to the trigger, the channel state engine is configured to:
determine which mobile device has quality of service issues;
receive, from the determined mobile device, channel state information measurements report responsive to a request;
receive, from neighboring mobile devices, channel state information measurements reports responsive to requests sent to each of the neighboring mobile devices;
determine one or more interfered transmitting resources based on the channel state information measurements report and the channel state information measurements reports; and
locate the external interference using triangulation data from the determined mobile device and the neighboring mobile devices.

14. The system of claim 13, wherein the channel state engine is further configured to:
instruct one or more base stations to suspend allocation of the one or more interfered transmitting resources to mobile devices that are proximate to or are at a location of the external interference.

15. The system of claim 14, wherein the one or more interfered transmitting resources are one or more of one or more physical resource blocks, one or more sub-carriers, and one or more frequency bands.

16. The system of claim 13, wherein the channel state engine is further configured to:
identify the neighboring mobile devices based on having a higher probability of being subject to the external interference than other mobile devices.

17. The system of claim 13, wherein the request includes measurement reporting interval information and measurement reporting type.

18. The system of claim 13, wherein the performance engine is further configured to:
formulate key performance indicators from the network performance data maintained in a configuration server; and
send the trigger when one or more key performance indicators fail to meet a respective key performance threshold.

19. The system of claim 13, wherein the triangulation data is at least one of an angle at which an interference signal is received by a mobile device or an intensity at which an interference signal is received by a mobile device.

20. A method, comprising:
triggering, a channel state engine, when network performance data indicates a presence of external interference on least one transmitting resource;

determining, by the channel state engine, which mobile device has quality of service issues;

receiving, by the channel state engine from the determined mobile device, channel state information measurements report responsive to a request;

receiving, by the channel state engine from neighboring mobile devices, channel state information measurements reports responsive to requests sent to each of the neighboring mobile devices;

determining, by the channel state engine, one or more interfered transmitting resources based on the channel state information measurements report and the channel state information measurements reports;

locating, by the channel state engine, the external interference using triangulation data from the determined mobile device and the neighboring mobile devices; and instructing, by the channel state engine, one or more base stations to halt allocation of the one or more interfered transmitting resources to mobile devices that are proximate to or are at a location of the external interference.

* * * * *